(12) United States Patent
Wurms

(10) Patent No.: US 10,230,229 B2
(45) Date of Patent: *Mar. 12, 2019

(54) ADJUSTABLE FLOOR BOX

(71) Applicant: Hubbell Incorporated, Shelton, CT (US)

(72) Inventor: Scott B. Wurms, Shelton, CT (US)

(73) Assignee: HUBBELL INCORPORATED, Shelton, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/602,992

(22) Filed: May 23, 2017

(65) Prior Publication Data

US 2017/0256930 A1    Sep. 7, 2017

Related U.S. Application Data

(63) Continuation of application No. 14/727,210, filed on Jun. 1, 2015, now Pat. No. 9,667,053.

(51) Int. Cl.
| | |
|---|---|
| *H02G 3/38* | (2006.01) |
| *H02G 3/18* | (2006.01) |
| *H02G 3/08* | (2006.01) |
| *H02G 3/12* | (2006.01) |

(52) U.S. Cl.
CPC ............ *H02G 3/383* (2013.01); *H02G 3/081* (2013.01); *H02G 3/083* (2013.01); *H02G 3/12* (2013.01); *H02G 3/185* (2013.01)

(58) Field of Classification Search
None
See application file for complete search history.

(56) References Cited

U.S. PATENT DOCUMENTS

| | | |
|---|---|---|
| 2,378,861 A | 6/1945 | Peevey |
| 2,811,574 A | 10/1957 | Guerrero |
| 4,091,231 A | 5/1978 | Sotolongo |

(Continued)

FOREIGN PATENT DOCUMENTS

FR    2 798 522 B1    11/2001

OTHER PUBLICATIONS

International Search Report dated Sep. 8, 2016, issued in counterpart PCT Patent Application No. PCT/US2016/033885.

*Primary Examiner* — Dimary S Lopez Cruz
(74) *Attorney, Agent, or Firm* — Dickinson Wright PLLC

(57) ABSTRACT

An electrical floor box assembly includes a box having a bottom wall, a plurality of side walls and a top portion having an opening at a top end thereof for providing access to the electrical box. An adapter has an open top end, an open bottom end and a passage extending between the top end and bottom end. The adapter has an outer dimension complementing a dimension of the opening in the electrical box and is received in the opening for movement between a retracted position and an extended position within the opening. The electrical box and adapter are configured for coupling and fixing the axial movement of the adapter with respect to the electrical box by rotation of the adapter to a locking position. In one embodiment, the electrical box and the adapter have interlocking teeth that mate with each other to prevent axial movement of the adapter. A locking member is provided to fix the position of the adapter relative to the electrical box to prevent rotation of the adapter.

20 Claims, 13 Drawing Sheets

(56) References Cited

U.S. PATENT DOCUMENTS

| | | |
|---|---|---|
| 4,780,571 A | 10/1988 | Huang |
| 5,466,886 A | 11/1995 | Lengyel et al. |
| 5,783,774 A | 7/1998 | Bowman |
| 7,271,351 B2 | 9/2007 | Drane |
| 7,795,544 B2 | 9/2010 | Peck |
| 9,553,438 B2 * | 1/2017 | Korcz .................... H02G 3/126 |
| 2009/0218128 A1 | 9/2009 | Carbone et al. |
| 2011/0036038 A1 | 2/2011 | von Rummelhoff |

* cited by examiner

ADJUSTABLE FLOOR BOX

This application is a Continuation patent application Ser. No. 14/727,210, filed Jun. 1, 2015, which is hereby incorporated by reference in its entirety.

FIELD OF THE INVENTION

The present invention relates generally to a floor box for mounting an electrical wiring device. More particularly, the present invention relates to a floor box having a height that can be adjusted to compensate for differences in the depth or thickness of the floor. The present invention also relates to a floor box having partitions for separating high voltage wiring and low voltage wiring and having a height that can be adjusted to position the wiring device below the cover.

BACKGROUND OF THE INVENTION

Electrical floor boxes are commonly used in connection with poured floors, such as concrete floors. Many of the electrical floor boxes have a height that is typically fixed. Therefore, when the final height of the poured floor is less than the height of the floor box, the floor box can extend from the surface of the floor. When the height of the floor is higher than the height of the floor box, the floor box must be raised with respect to the surface of the floor. The floor box cannot be raised after installation in a concrete floor.

Additionally, various building codes limit the amount and type of electrical wiring and connections that a floor box can contain within a particular volume and other codes require boxes that accommodate multiple services, such as power and data, maintain physical separation between the various services within the box. Therefore, in order to satisfy these requirements, it is necessary to determine the interior volume of the floor-box before the components housed within it can be wired and activated and, further, to maintain separation between various services within the box.

One example of a floor box is disclosed in U.S. Pat. No. 5,466,886. The floor box can have a variable height by cutting a portion of the top end of the floor box. This floor box is provided with a divider for separating and insulating high voltage power wires from low voltage communication wires. The electrical outlet box assembly includes a non-metallic one-piece tubular housing to be positioned in a concrete floor and is provided with electrical shielding assembly within the housing.

Another example of an electrical floor box is disclosed in U.S. Pat. No. 8,704,090 to Carbone et al. The electrical box is provided with a fixed riser extending upward from an integral flange as a one-piece unit. The flange is connected to the open end of the electrical box. A divider assembly can be positioned in the open end of the riser and the electrical box to separate wiring as needed.

Although the prior devices have generally been suitable for their intended use, there is a continuing need to provide a floor box to accommodate electrical wiring devices that can be adjusted or modified as needed.

SUMMARY OF THE INVENTION

The present invention relates generally to a floor box for mounting an electrical wiring device. More particularly, the present invention relates to a floor box having a height that can be adjusted to compensate for differences in the depth or thickness of the floor.

The invention relates to a floor box configured for positioning in a concrete floor where the height of the electrical box assembly can be adjusted at the work site to ensure that the open end of the electrical box assembly is positioned at the desired position relative to the surface of the floor. The electrical box assembly has an electrical box and an adapter that can be positioned selectively with respect to the electrical box for positioning the wiring device and the top end of the assembly in a predetermined position. In one embodiment of the invention the electrical box can have a riser or cylindrical collar that extends upwardly from the body of the electrical box.

A further feature of the present invention is to provide a floor box including an electrical box having an adapter for supporting the electrical wiring device where the adapter can be adjusted with respect to the electrical box.

The floor box of the present invention allows the final height of the floor box to be adjusted and readjusted as different flooring options are installed during the life of the building. The height of the floor box is set by the position of the adapter where the top end of the adapter is set flush with the finished floor. The floor box is able to position the wiring device relative to the cover at the floor surface. The installation of the floor box will appear the same regardless of the adjustment for different installations. The wiring device can be set about 3 inches below the cover so as not to impede access to the wiring device while allowing a straight plug to be concealed.

The floor box of the invention includes a riser and an adapter that is adjustable relative to the riser and the electrical box. The electrical box can be non-metallic, such as PVC, with hubs for use with non-metallic conduits, a cast iron box for use with threaded rigid conduits, and a stamped steel box with knockouts for EMT.

The invention is directed to an electrical floor box assembly where the height of the assembly can be adjusted and selected depending on the needs and dimensions of the floor.

The electrical box assembly of the invention has at least one and typically two axially spaced dividers positioned within the electrical box to divide the interior of the box into compartments for high voltage and low voltage wiring. The dividers in one embodiment have a continuous or substantially continuous side wall to define a central open area separated from the outer open area around the dividers. The dividers can be stacked or nested on each other to form separate wiring compartments extending the height of the electrical box as needed.

The electrical box assembly of the invention in one embodiment has an electrical box with an open top end. A riser extending upward from a flange is coupled to the open end of the electrical box. Typically the flange is attached to the electrical box by fasteners such as screws that thread into screw holes in the electrical box.

Another feature of the invention is an electrical box having an adapter to slide within the open end of the electrical box for selecting the height of the electrical box. In one embodiment, the adapter slides within the open end of the riser that is coupled to the electrical box. The adapter is able to slide upward from the open end of the electrical box and the adapter and can be locked in place to fix the position of the adapter and electrical wiring device coupled to the adapter and to prevent axial movement of the adapter and the electrical device.

In one embodiment of the invention, the adapter can be fixed to the open end of the electrical box by a suitable coupling assembly. The adapter can also be fixed to the riser to prevent axial movement of the riser and the open end of the electrical box.

The foregoing objects are also basically attained by an electrical floor box assembly having an electrical box, an adapter and coupling assembly to lock the position of the adapter with respect to the electrical box. The electrical box has a bottom wall, a plurality of side walls, and a top end having an opening at the top end for providing access into the electrical box. The adapter has an open top end, an open bottom end, a passage extending between the top end and the bottom end, and an outer dimension complementing an inner dimension of the opening of the electrical box. The adapter can be received in the open end of the electrical box and is movable between a retracted position and an extended position within the opening in the electrical box. The coupling assembly is provided to fix the axial position of the adapter with respect to the electrical box by rotation of the adapter with respect to the opening in the electrical box.

The various features of the invention are also attained by providing an electrical floor box assembly including an electrical box and an adapter. The electrical, box has a bottom wall, a plurality of side walls and an open end providing access into the electrical box where the open end defines a passage having an inner surface. The adapter has an outer dimension complementing the inner dimension of the passage of the electrical box and is received in the passage for sliding movement to adjust the axial position of the adapter with respect to the electrical box. The adapter has an open top end configured for mating with a cover assembly and has an open bottom end. The adapter has an open passage for supporting an electrical device within the open passage and spaced from the top end a distance to enable the cover assembly to close. The adapter and the electrical box are configured to fix the axial position of the adapter with respect to the electrical box by rotational movement of the adapter with respect to the electrical box.

The features of the invention are also attained by providing an electrical floor box assembly having an electrical box, a riser, and an adapter. The electrical box has a bottom wall, a plurality of side walls and a top end. The riser is coupled to the electrical box and extends upwardly to define an open end of the electrical box. The riser has an open top end for providing access into the electrical box. The riser has an inner surface forming an open passage extending between the open top end of the riser and the electrical box. The passage of the riser has a coupling member for mating with the adapter. The adapter has an outer dimension complementing an inner dimension of the open top end of the riser and is received in the axial passage of the riser for sliding adjustment between a first retracted position and a second extended position. The adapter has a coupling member configured for mating with the coupling member of the riser to fix the axial position of the adapter with respect to the riser and the electrical box.

Various objects, advantages, and salient features of the invention will become apparent from the following detailed description, which, taken in conjunction with the annexed drawings, discloses an exemplary embodiment of the present invention.

As used in this application, the terms "front", "real", "upper", "lower", "upwardly", "downwardly", and other orientation descriptors are intended to facilitate the description of the exemplary embodiments of the present invention, and are not intended to limit the structure thereof to any particular position or orientation.

BRIEF DESCRIPTION OF THE DRAWINGS

The above benefits and other advantages of the various embodiments of the present invention will be more apparent from the following detailed description of exemplary embodiments of the present invention and from the accompanying drawing figures, in which.

Throughout the drawings, like reference numerals will be understood to refer to like parts, components and structures.

DETAILED DESCRIPTION OF THE INVENTION

Figure 1:
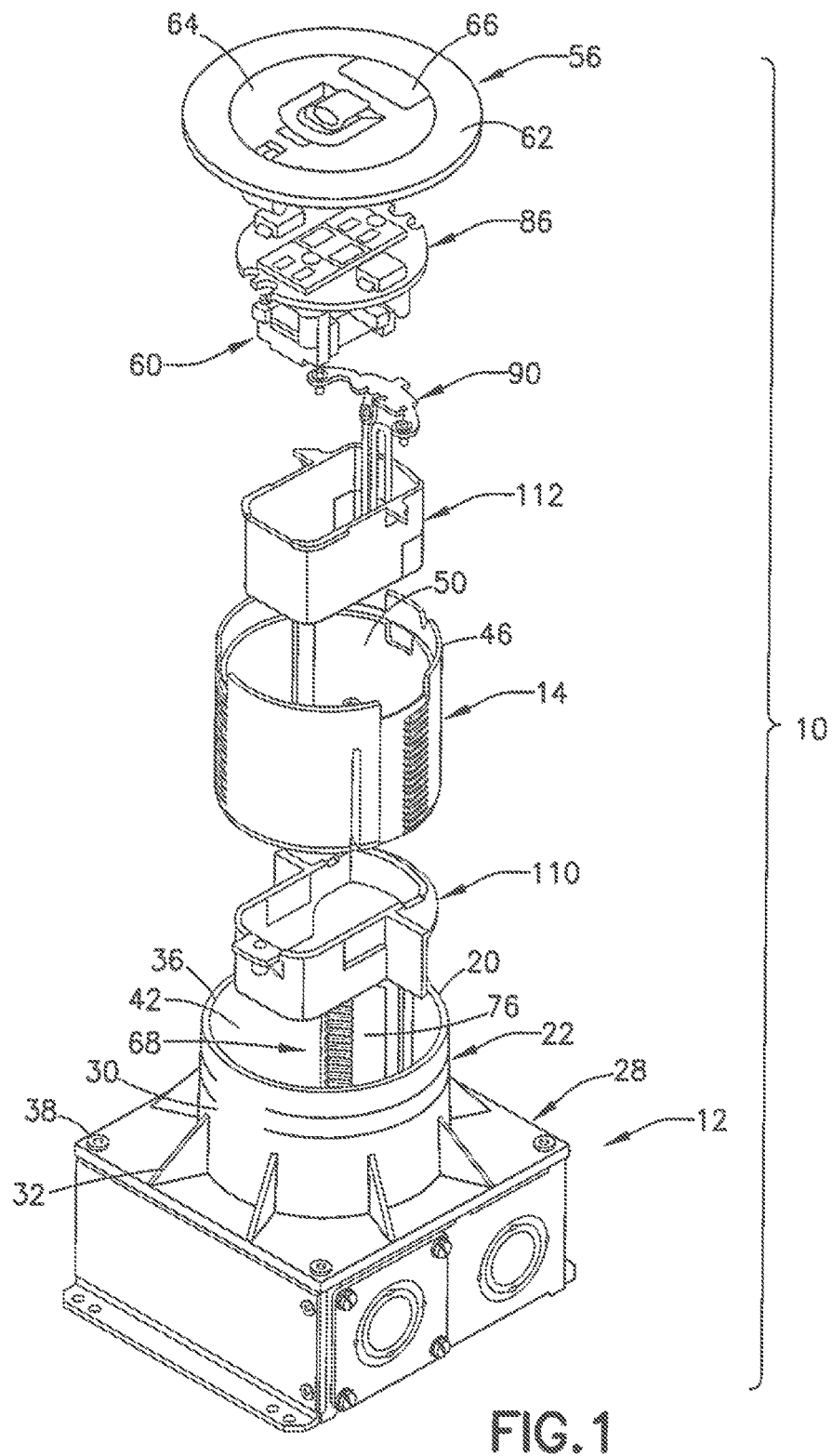
FIG. 1 is an exploded perspective view of the electrical box assembly in accordance with an embodiment of the present invention.

The present invention is directed to an electrical floor box having a height that can be adjusted on the work site without the use of special tools.

Referring to the drawings, the invention is directed to an electrical floor box assembly 10 that includes an electrical box 12 and an adapter 14. The adaptor 14 is configured for being adjustable relative to the electrical box 12 to modify or adjust the height of the electrical box assembly 10.

The electrical box 12 in the embodiment shown has a bottom wall 16 and a plurality of side walls 18 extending upward from the bottom wall 16. In the embodiment shown, the electrical box 12 has a substantially square configuration with four side walls. In other embodiments, the electrical box 12 can have more than four sides and can have other configurations such as a rectangular or hexagon shape. The electrical box 12 is provided with an open top end 20 providing access to the interior cavity of the electrical box. In the embodiment illustrated, the side walls 18 include knock-outs or pry-outs 19 for accessing the interior of the electrical box and feeding electrical wiring into the electrical box and to the wiring device supported within the box. In other embodiments, the electrical box can have hubs to connect to different types of conduits.

Figure 2:
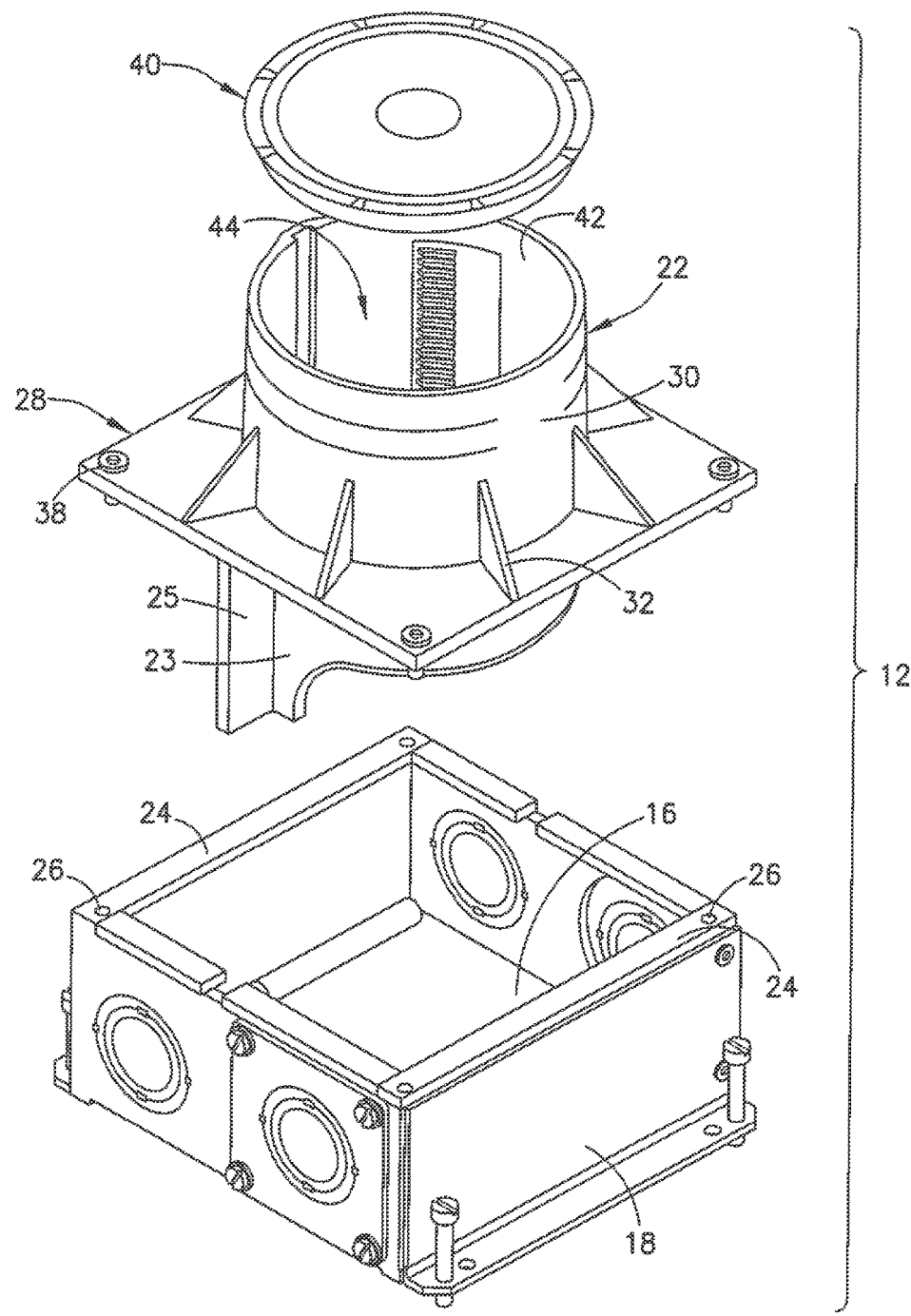
FIG. 2 is a perspective view of the electrical box assembly of FIG. 1 without the adapter.
Figure 3:
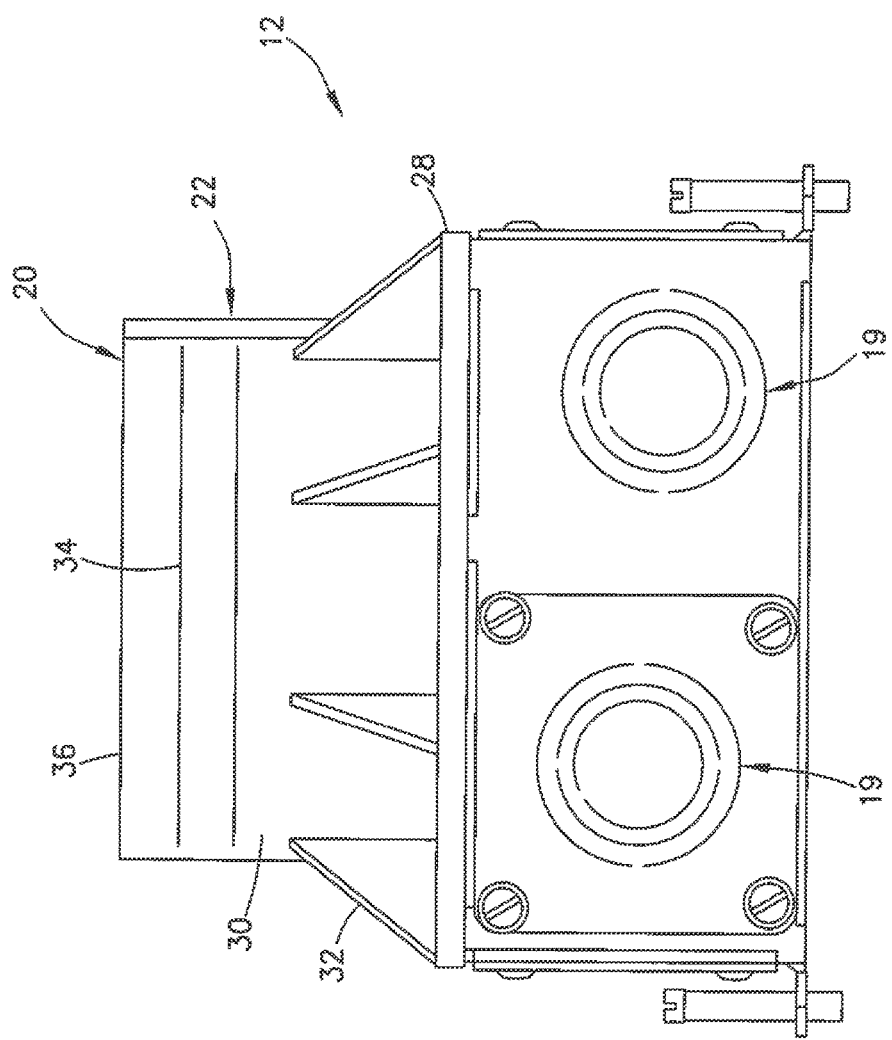
FIG. 3 is a side view of the electrical box assembly.
Figure 11:
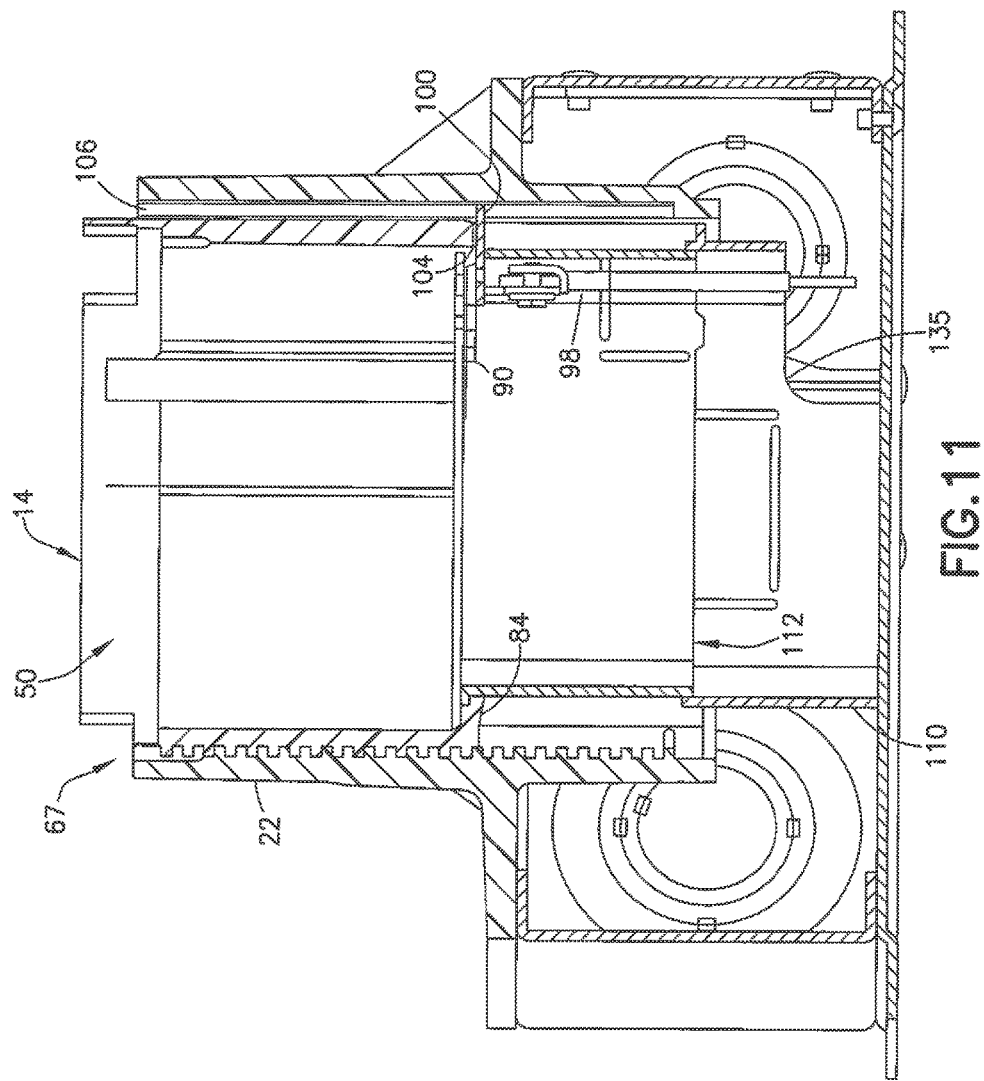
FIG. 11 is a side view in partial cross section showing the position of the adapter relative to the electrical box.

In the embodiment shown, the electrical box 12 includes a riser 22. The side walls 18 of the electrical box terminate at a top edge and have inwardly extending flanges 24 to form an open end as shown in FIG. 2. The flanges 24 include screw holes 26. Riser 22 in the embodiment shown has a mounting flange 28 extending outwardly from a side wall 30 of the riser 22. In the embodiment shown in FIG. 2, the riser 22 extends above the top face of the mounting flange 28 and has a bottom portion 23 extending below the bottom face of mounting flange to extend into the cavity of the electrical box 12 as shown in FIGS. 2 and 11. The bottom portion 23 has one or more outwardly extending flanges 25 for separating the wiring within compartments formed in the electrical box. Reinforcing ribs 32 extend between the outer surface of the riser 22 and the top face of the mounting flange 28 to provide sufficient strength to the riser 22. As shown in FIGS. 2 and 3, the outer surface of the riser 22 is provided with indicia 34 for assisting the installer in positioning the top end 36 of the riser with respect to the floor.

In one embodiment of the invention the electrical box 10 is formed with the bottom wall 16 and the side walls 14 made of metal such as a suitable grade of steel. In other embodiments the electrical box can be made of plastic or other non-metallic material. The riser 22 can be made of plastic or other non-metallic material. As shown, the mounting flange 28 of the riser 22 is provided with screw holes 38 for receiving screws to attach the riser 22 to the flanges 24 to form the electrical box 12. As shown in FIG. 2, a temporary cover 40 can be attached to the top end 36 of the riser 22 during installation of the electrical box 12. The temporary cover 40 can be removed after installation of the electrical box.

Riser 22 in the embodiment shown has a substantially circular or cylindrical configuration with an inner surface 42. Riser 22 has an open top end and an open bottom end and an axial passage 44 extending between the top end and the bottom end.

Figure 5:
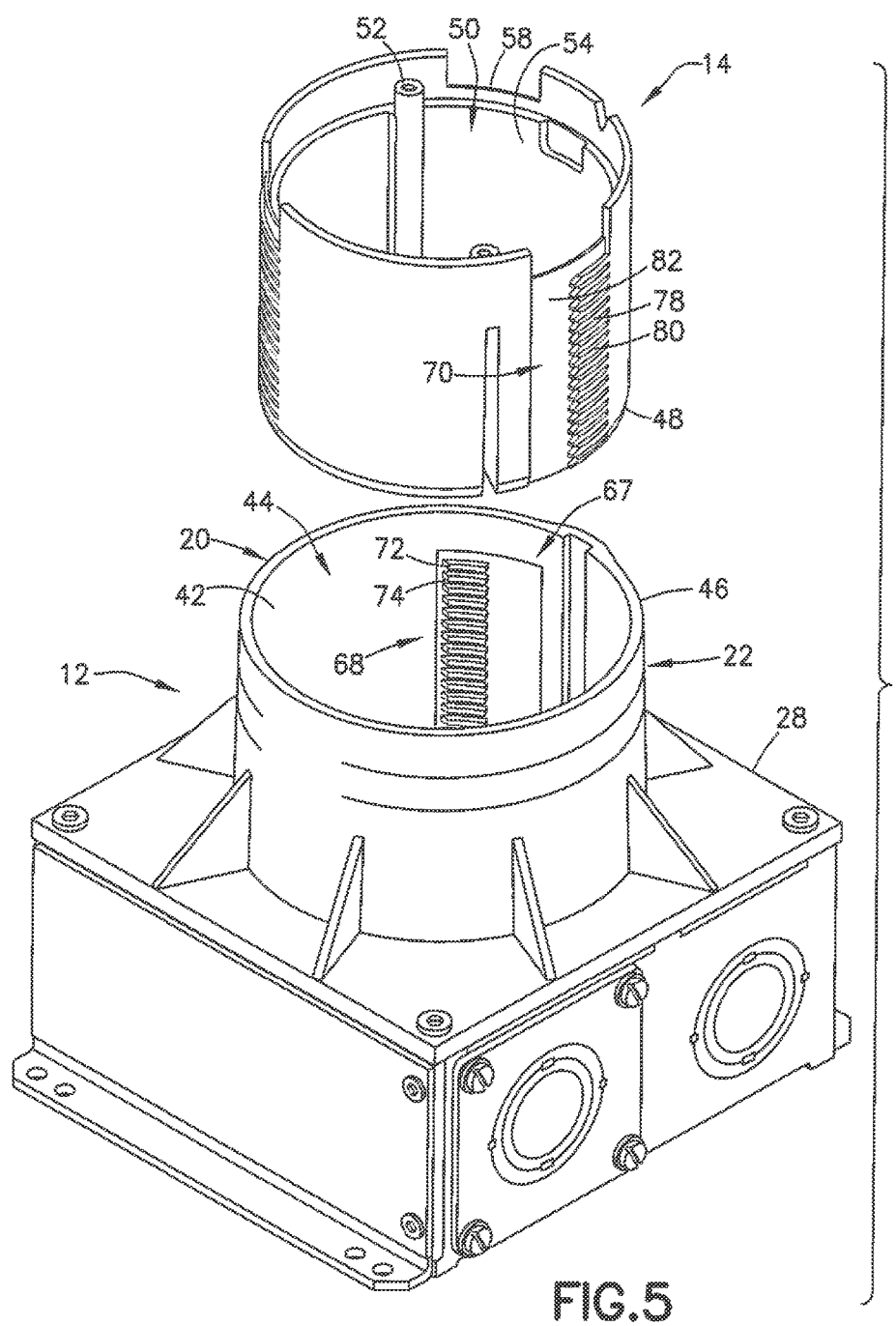
FIG. 5 is a perspective view showing the adapter relative to the open end of the electrical box.
Figure 6:
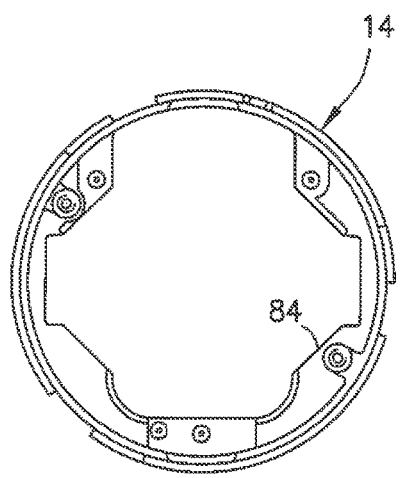
FIG. 6 is a top view of the adapter showing the mounting plates for supporting the electrical wiring device.

Adapter 14 has a height and a width complementing the inner dimensions of riser 22. As shown in FIGS. 1 and 5, adapter 14 has a substantially cylindrical shape complementing the inner dimension of riser 22 for sliding within the axial passage 44 of the riser 22. Adapter 14 has an open top end 46 and an open bottom end 48 with an axial passage 50 extending between the top end 46 and the bottom end 48.

As shown in FIG. 5, adapter 14 includes two screw bosses 52 formed on the inner surface 54. The screw bosses 52 are oriented for coupling with the cover 56 as shown in FIG. 1. Notches 58 are formed in the top end 46 of adapter 14 for accommodating the cover 56. In the embodiment shown, the cover 56 is attached to the electrical box assembly 10 to close the open end and cover the electrical wiring device 60. The cover 56 includes a flange 62 for contacting the floor and a hinged closure 64 for accessing the wiring device. The closure can have an egress door 66 which can be opened to allow an electrical cord to be connected to the wiring device 60 while the cover is closed to reduce the tripping hazard.

Figure 4:
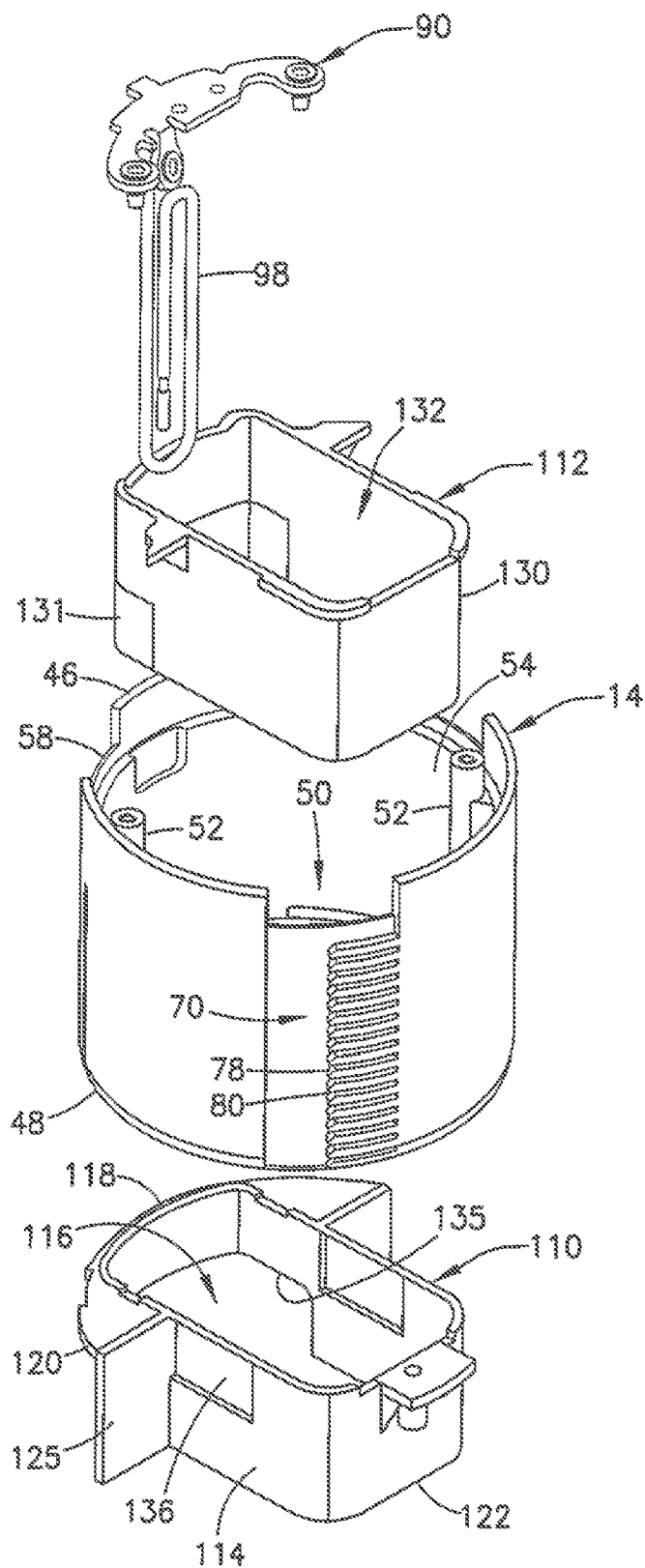
FIG. 4 is an exploded perspective view showing the adapter, the upper and lower partitions and the ground assembly in one embodiment the invention.

Referring to FIGS. 4 and 5, the electrical box 12 and the adapter includes a coupling assembly for coupling the adapter 14 within the open top end 20 of the electrical box 12 and the axial passage 44 of the riser 22. The coupling assembly 67 connects the adapter 22 to the electrical box and the riser 22 to fix the axial position of adapter 14 with respect to the open top end of the electrical box. In one embodiment of the invention, the adapter 14 is configured to slide axially within the axial passage of the riser 22. The adapter is able to slide within the riser between a retracted position and an extended position to adjust selectively the position of the adapter 14 with respect to the open top end of the electrical box thereby adjusting the overall height of the electrical box and the assembly.

The coupling assembly 67 in one embodiment of the invention includes a first coupling member 68 on the inner surface of the riser 22 as shown in FIG. 5 and a second coupling member 70 formed on the outer surface of the adapter 14 shown in FIG. 11. The adapter 14 is configured to slide axially within the riser and to be able to lock into a fixed position by rotational movement of the adapter 14 with respect to the electrical box and the riser 22. In use, the adapter 14 slides within the riser 22 and is manually position to the selected height to extend from the top end of the electrical box and the riser a predetermined distance. The adapter 14 is rotated to engage the coupling members 68 and 70 which prevents further rotation of the adapter member and prevents axial movement of the adapter 14 within the passage of the riser 22 and the electrical box 12.

In one embodiment of the invention, the coupling member 68 and the coupling member 70 are defined by at least one tooth and at least one groove for interlocking to prevent axial movement of the adapter after rotating the adapter to the locked position. In the embodiment shown, the coupling member 68 is defined by a plurality of spaced apart teeth 72 defining grooves 74 between the adjacent teeth 72. The teeth 72 are formed on the inner surface of the riser and extend at an angle with respect to the longitudinal axis of the riser 22. In the embodiment shown, the teeth 72 extend in a direction substantially perpendicular to or transverse to the longitudinal axis of the riser 22. In alternative embodiments, the teeth 72 can extend at an inclined angle relative to the longitudinal dimension of the riser 22.

Figure 7:
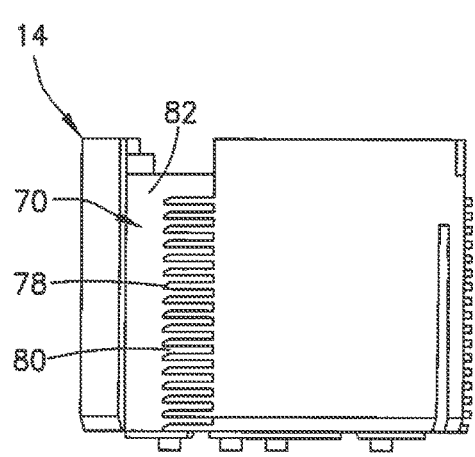
FIG. 7 is a side view of the adapter in one embodiment of the invention.

The adapter 14 includes complementing teeth 78 forming a coupling member 70. The teeth 78 are oriented to complement the teeth 72 whereby rotation of the adapter 14 enables the teeth to engage each other and fix the position of the adapter 14 within the axial passage of the riser 22 and prevent axial movement of the adapter 14. As shown in FIGS. 4, 5 and 7, the teeth 78 form complementing grooves 80 between the adjacent teeth 78 to mate with corresponding teeth 72 of riser 22. As shown, the teeth 78 are formed in the recess 82 of the adapter 14. The teeth 72 and the teeth 78 are oriented along the longitudinal dimension of the adapter and the riser. In the embodiment shown, the plurality of teeth 72 and 78 extend a substantial portion of the longitudinal length of the adapter 14 and the riser 22 to enable the adapter to slide axially within the riser 22 and selectively fix and lock the axial position of the adapter by the teeth mating with one another. As shown in the drawings, the adapter 14 is initially positioned within the axial passage of the riser 22 where the teeth are not engaging. The teeth 72 of the riser 22 can slide within the recess 82 to enable the adapter 14 to slide axially in the riser 22. The adapter 14 slides within the riser to the selected position at which point the user manually rotates the adapter relative to the electrical box and the riser to engage the teeth and fix the axial position of the adapter.

In the embodiment shown, three sets of coupling members, shown as complementing teeth on the adapter and the riser, are included to provide a secure support for the adapter 14 relative to the riser 22 and the electrical box 12. In other embodiments, the assembly can be provided with any number of sets of teeth or coupling members spaced around the adapter and the opening in the electrical box to support the adapter and fax the axial position of the adapter 22 relative to the riser 22 and the electrical box 12.

The coupling members for adjusting and fixing the position of the adapter with respect to the opening in the electrical box 12 and the riser 22 are shown as interlocking teeth that mate with each other. Other forms of coupling members can be used that are able to permit the sliding adjustment of the adapter 14 with respect to the opening in the electrical box and the riser. One example of a suitable adjustment and coupling assembly can include a cam system where the adapter and the inner surface of the riser have opposing inclined cam surfaces configured to allow the adapter to slide axially in the open passage of the riser. By rotation of the adapter with respect to the riser, the inclined cam surfaces mate and wedge the adapter in the passage of the riser to prevent axial movement.

Figure 10:
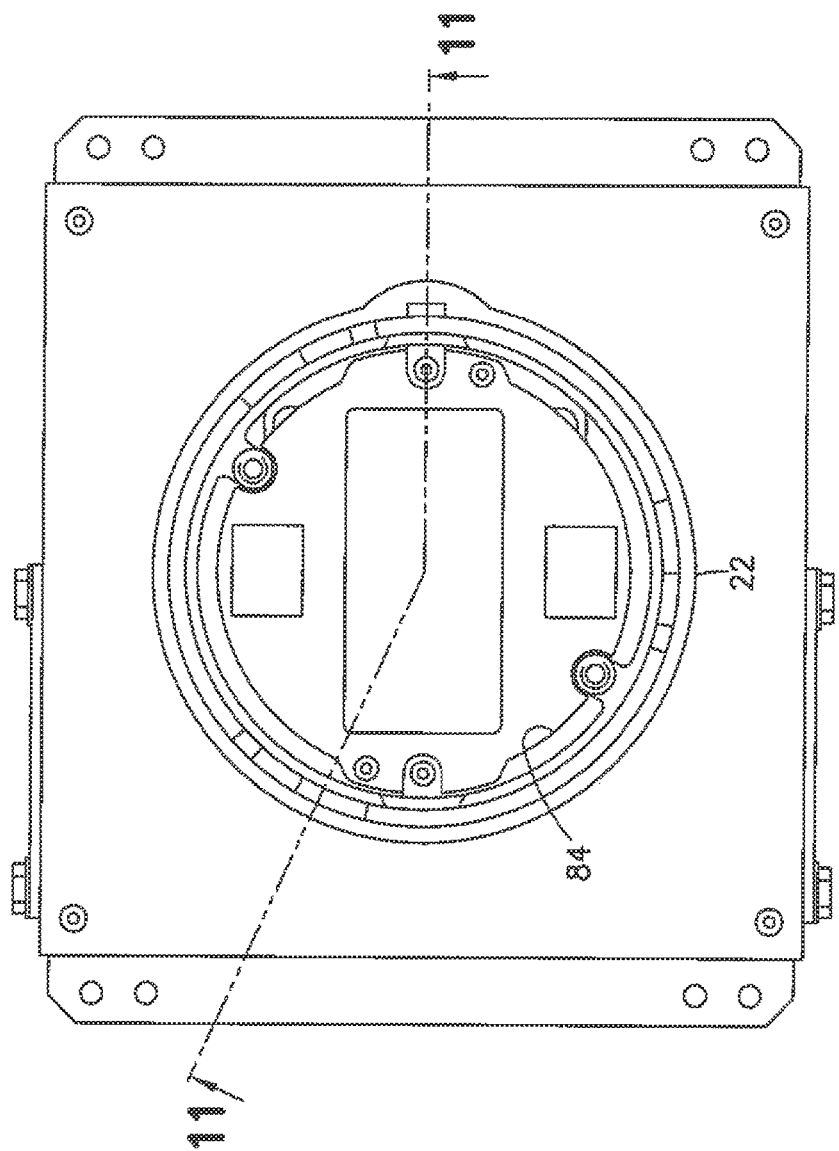
FIG. 10 is a top view of the electrical box and adapter.
Figure 12:
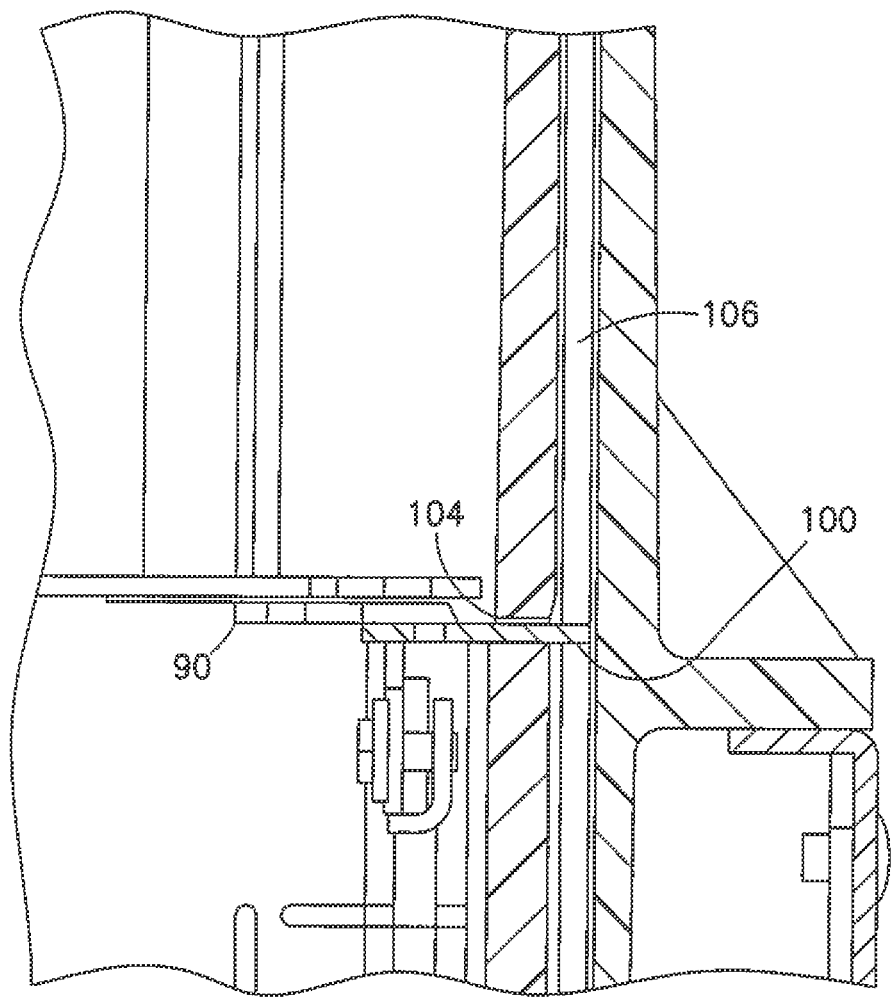
FIG. 12 is a side view in cross section showing the ground assembly extending through the adapter to engage the open end of the electrical box to fix the rotational position of the adapter relative to the electrical box.

In the embodiment shown in FIGS. 10-12, the adapter 14 has a lip 84 extending radially inward at the bottom edge for supporting the wiring device 60 and the cover plate 86 within the axial passage of the adapter 14. As shown in FIG. 11, the wiring device and the cover 26 are positioned at the bottom end of the adapter 14 so that the wiring device is recessed from the top end of the adapter and recessed from the cover assembly 56.

Figure 8:
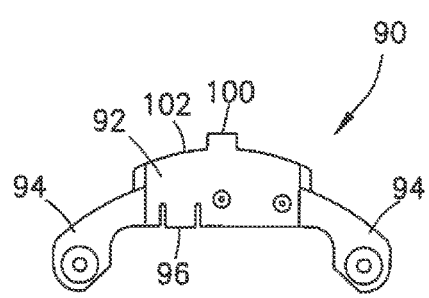
FIG. 8 is a top view of the ground assembly in one embodiment.
Figure 9:
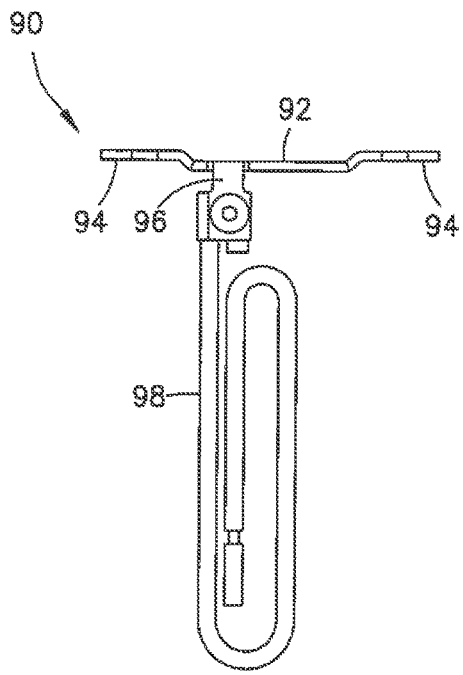
FIG. 9 is a side view of the ground assembly of FIG. 8.

A ground assembly 90 is provided for grounding the electrical wiring device mounted within the electrical box assembly. The ground assembly 90 as shown in FIGS. 8 and 9 has a body portion 92 with two extending legs 94 for coupling to the wiring device. In one embodiment as shown, a downwardly extending tab 96 extends from the body 92 and includes a ground wire or pigtail 98. As shown, the body 92 includes a locking member in the form of a tab 100 extending outward from an outer edge 102. In one embodiment of the invention, the tab 100 can have a leg extending upward from the plane of the tab 100 and from the plane of the body 92. As shown in FIGS. 10-12, the ground assembly 90 is attached to the lip 84 of the adapter 14.

The side wall of the adapter 14 has an aperture 104 aligned with the ground assembly 90 so that the tab 100 projects outwardly from the outer surface of the adapter. As shown, the inner surface of the riser 22 includes a longitudinal slot or groove 106. The groove 106 is oriented with respect to the ground assembly 90 so that the tab 100 projects into the groove 106 to prevent rotation of the adapter 14 with respect to the riser 22 and the electrical box 12 when the ground assembly 90 is attached to the adapter 14. During use, the adapter 14 is adjusted axially within the riser and the open end of the electrical box to the selected position and then rotated to fix the axial position of the adapter by the interlocking teeth. The ground assembly 90 is inserted into the adapter 14 and coupled to the lip 84 of the adapter 14 with the tab 100 extending through the aperture 104 and into the groove 106 thereby preventing rotation of the adapter 14 with respect to the riser 22.

Figure 13:
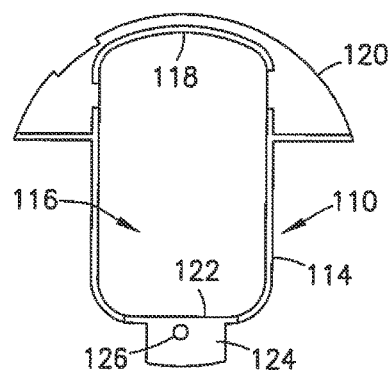
FIG. 13 is a top view of the lower partition in one embodiment of the invention.
Figure 14:
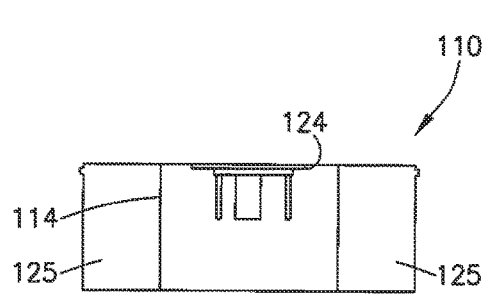
FIG. 14 is a side view of the lower partition of FIG. 13.

In one embodiment shown in the drawings, the electrical box assembly includes a divider to separate high voltage wires from low voltage wires such as data cables. In the embodiment shown, the electrical box assembly includes an upper divider cup 110 and a lower divider cup 112. Referring to FIGS. 13 and 14, lower divider cup 110 has a side wall 114 forming an axial passage 116 for receiving wires. Lower divider cup 110 has a longitudinal length complementing the diameter of the riser 22 and the open end of the electrical box 12. In the embodiment shown, lower divider cup 110 has a height complementing the height of the electrical box. A first end 118 has a flange 120 for mating with the inner surface of the riser 22 and a second end 122 with a flange 124 having a clearance hole 126 for receiving the mounting screw of the wiring device when the adapter 14 is in its lowest, retracted position.

The flange 120 has a downwardly extending wing or wall portion 125 to form separate wiring compartments in the electrical box 12. In one embodiment, the wall portion 125 is oriented with the flange 25 of the riser 22 to form the wiring compartments in the electrical box 12. The flange 120 and the wall portion 125 contact the lower portion 23 of the riser 22 to form an outer wiring compartment that is separate from the inner wiring compartment formed by the side wall 114. The wall portions 125 extend outwardly from the side wall 114 for mating with the inner surface of the riser 22 and define axial passages 128 between the side wall 114 and the inner surface of the riser so that the axial passages 128 are spaced and separate from the axial passage 116. The lower divider cup 112 is located by positioning the wall portions 125 in slots formed in the bottom end of the riser 22 and held in place by gravity and by interference locators. The outer edge of the flanges 120 and 124 are pushed past the locators to hold the lower divider cup in place.

Figure 15:
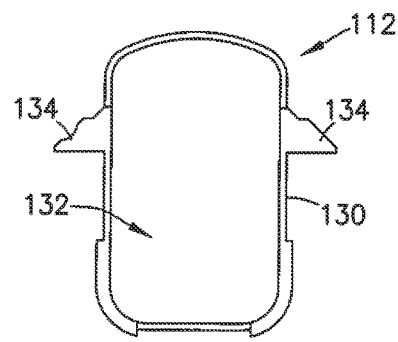
FIG. 15 is a top view of the upper partition in one embodiment of the invention.
Figure 16:
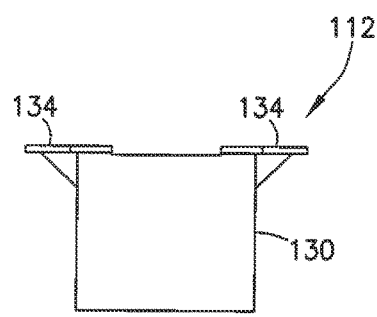
FIG. 16 is a side view of the upper partition of FIG. 15.
Figure 17:
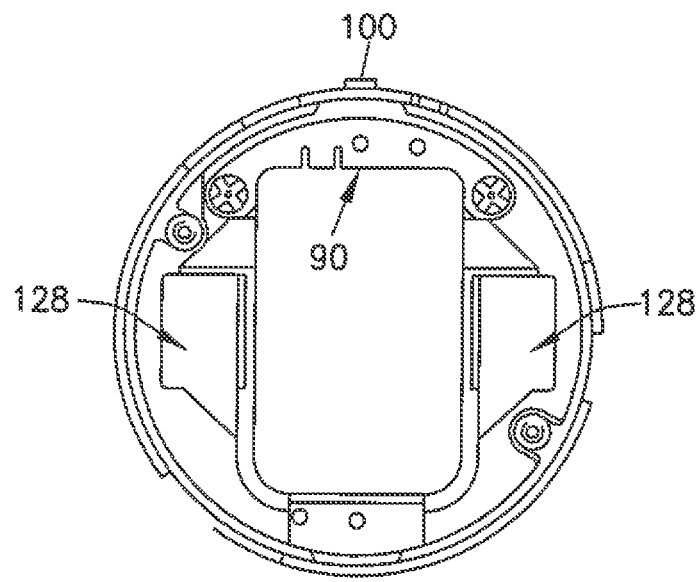
FIG. 17 is a top view of the assembly showing the upper partition received in the axial passage of the adapter.
Figure 18:
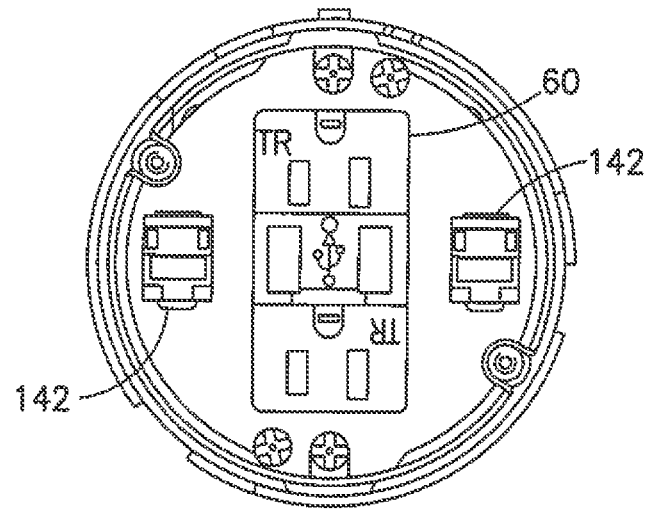
FIG. 18 is a top view of the assembly showing the mounting plate and electrical wiring devices mounted within the assembly.

The upper divider cup 112 as shown in FIGS. 15 and 16 has a similar shape and complementing structure as lower divider cup 110. The upper divider cup 112 has a shape and dimension to nest with the lower divider cup 110 when assembled in the electrical box assembly 10. The upper divider cup 112 telescopes with the lower divider cup 110 to maintain separate wiring compartments or chambers. When the total finished height is greater than about 6.5 inches, a second lower divider cup can be stacked on the first lower divider cup to maintain service separation. Upper divider cup 112 has a side wall 130 with a generally rectangular shape and forming a central axial passage 132. The side wall 130 has outwardly extending flanges 134 and flanges 137 for mating with the inwardly extending lip of the adapter 14. The side wall 130 has a removable section 131 at one end adjacent the bottom edge to provide access for wiring.

The lower divider cup 110 is provided with an access opening 135 in the side wall 114 at the first end for directing wiring from the electrical box 12 to the axial passage 116 of the divider cup 110 as shown in FIG. 11. The removable section 131 of the upper divider cup 112 shown in FIG. 1 is oriented to cooperate with the access opening 135 to feed or direct wiring into the divider cups when the upper divider cup nest with the lower divider cup. The side portions of the side wall 114 can include removable sections 136 as shown in FIG. 1 that can be removed to provide clearance for data devices when the divider cups are deeply nested.

The lower divider 110 is placed in the electrical box 12 during assembly and the connections of the electrical components are made to the electrical wiring within the box. The lower divider 110 is passed through the open end of the riser 22 and positioned on the bottom wall of the electrical box and can be located by sliding the wall portions 125 into slots in the bottom of the riser 22. The adapter 14 is then placed in the adapter 22 and positioned in the selected axial position with respect to the open end of the electrical box and the open end of the adapter 14. The adapter 14 is then rotated with respect to the riser 22 to interlock the complementing teeth and fix the axial position of the adapter 14 with respect to the electrical box and the adapter 14. The position of the top end of the adapter 14 is positioned a selected distance from the top end of the electrical box and the riser 22 so that the top end of the adapter 14 is in a proper position relative to the floor during installation of the electrical box assembly 10. The upper divider cup 112 is then placed in the adapter 14 and positioned above the lower divider cup 110 with the axial passages of the upper and lower adapter cups aligned to form a continuous central axial passage 116 for the electrical wiring. The upper and lower divider cups are aligned to form two separate axial passages 128 on opposite sides of the central axial passage 116 for receiving and separating low voltage wiring as shown in FIG. 16.

In one embodiment, the upper divider cup 112 has a dimension less than the inner dimension of the lower divider cup 110 so that the upper divider cup 112 can slide into and nest in the lower divider cup 110 to form a continuous divider to separate the wiring.

The upper divider cup 112 is positioned on the inwardly extending flange of the adapter 14. The ground assembly 90 is then attached to the flange of the adapter 14 by screws so that the tab 100 extends through the aperture 104 in the adapter and into the groove 106 to prevent rotation of the adapter 14 with respect to the electrical box 12 and the riser 22. A cover plate 86 in the embodiment shown is provided for mounting the wiring devices to the Assembly. The cover plate 86 is coupled to the adapter 14 by suitable screws or other fasteners.

In the embodiment shown, the wiring device 60 is a duplex receptacle that is mounted in the center opening in the cover plate 86 and positioned in the central axial passage 116 of the upper and lower divider cups 112 and 110. Suitable wiring (not shown) is directed into the electrical box 12 and through the access opening 135 of the lower divider cup 110 into the axial passage 116 and connected to the wiring device. The cover plate 86 is provided with openings for supporting low voltage wiring devices such as data connectors 142. The low voltage wiring for the data connectors is directed into the electrical box and directed through the passages 128 between the divider cups and the electrical box and the inner surface of the riser 22 to separate the high voltage wires from the low voltage wires as shown in FIG. 16. The cover 56 is then coupled to the screw bosses 52 on the adapter 14 to provide access to the wiring devices.

Figure 19:
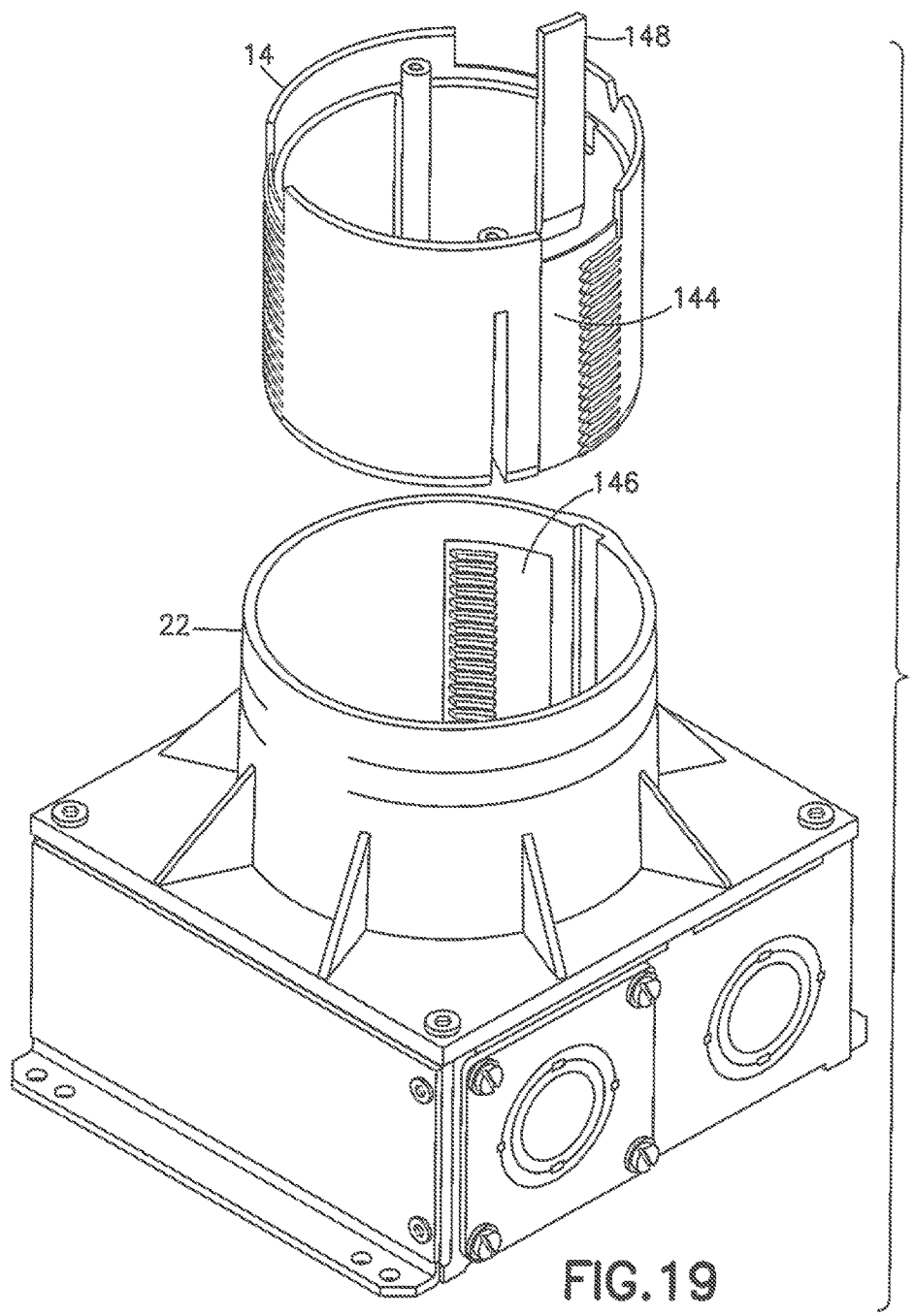
FIG. 19 is a perspective view of the electrical box assembly showing an alternative coupling and locking device for locking the position of the adapter and for preventing rotation of the adapter with respect to the electrical box.

The adapter 14 is configured to be received in the open end of the riser 22 for sliding adjustment and fixing the axial position. In another embodiment of the invention, the outer surface of the adapter 14 includes a longitudinal slot 144 next to or adjacent the interlocking teeth as shown in the FIG. 19. The inner surface of the riser 22 is also provided with a longitudinal slot 146 oriented to align with the slot 144 when the adapter 14 is rotated to the locking position where the complementing teeth interlock with each other. A locking strip 148 is inserted into the aligned slots 146 and 148 to prevent rotation of the adapter 14 with respect to the electrical box and the riser.

Figure 20:
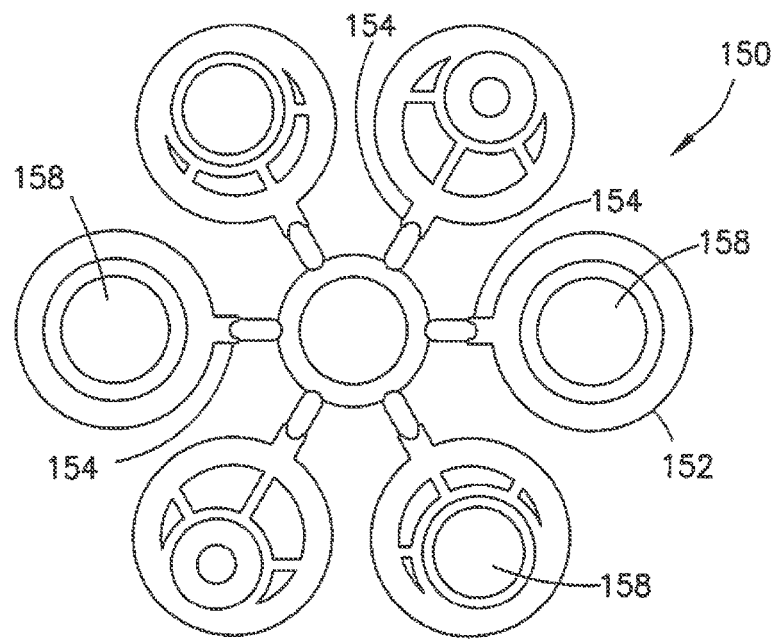
FIG. 20 is a top view of the assembly of conduit adapters for coupling to the electrical box.
Figure 21:
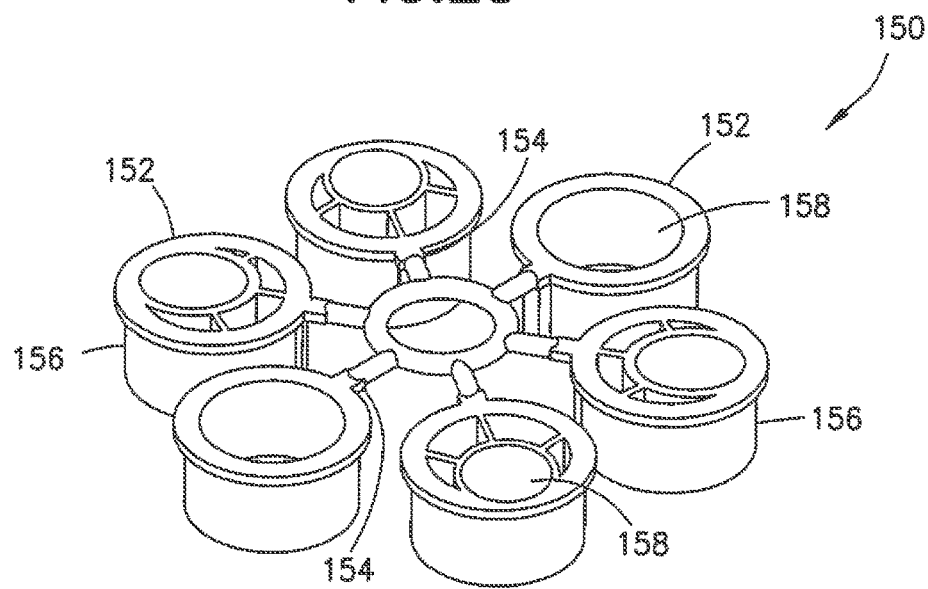
FIG. 21 is a perspective view of the assembly of FIG. 20.

The electrical wiring can be supplied to the electrical box through suitable conduits depending on the wiring and the location of the box and the wiring. The conduits can be metal or non-metallic depending on the wiring. In one embodiment, an assembly 150 of grommets 152 is provided for accommodating different size conduits. Referring to FIGS. 20 and 21 the assembly 150 is in the form a tree having each of the grommets 150 attached together as a unit by frangible connections 154. Each of the grommets 150 have an outer cylindrical body 156 with an outer dimension for mating with the opening in the electrical box or a connector coupled to the electrical box. Each of the grommets 150 have an inner axial passage 158 with a size and dimension to mate with a specific size conduit. In the embodiment shown, the axial passages 158 that have a dimension less than the dimension of the outer surface of the grommets is positioned at an outer edge of the grommet so that the center axis of the inner axial passage 158 is spaced outwardly from the center axis of the grommet and next to the outer edge of the body 156. In one embodiment, the center axis of the inner axial passage 158 is positioned as close to the outer perimeter as possible so the conduit can be positioned as close to the bottom wall of the electrical box as possible.

The foregoing embodiments and advantages are merely exemplary and are not to be construed as limiting the scope of the present invention. The description of an exemplary embodiment of the present invention is intended to be illustrative, and not to limit the scope of the present invention. Various modifications, alternatives and variations will be apparent to those of ordinary skill in the art, and are intended to fall within the scope of the invention as defined in the appended claims and their equivalents.

What is claimed is:

1. An electrical floor box assembly comprising:
   an electrical box having a top end with an opening providing access into said electrical box, said electrical box having a first coupling member;
   an adapter having an open top end, an open bottom end, a passage extending between said top end and bottom end of said adapter, said adapter having a second coupling member configured for coupling with said first coupling member, said adapter being rotatable within said opening in said electrical box between a first position and a second position, wherein when said adapter is in said first position, said second coupling member of said adapter does not engage said first coupling member and said adapter is removable from said opening, and when said adapter is in said second position, said second coupling member of said adapter engages said first coupling member to fix the axial position of said adapter in said opening of said electrical box; and
   a locking member coupled to an inner surface of said adapter and extending through an opening in said adapter and engaging an axial longitudinal groove on an inner surface of said opening in said electrical box to prevent rotation of said adapter with respect to said electrical box.

2. The electrical box assembly of claim 1, wherein
   said opening at said top end of said electrical box has a substantially circular configuration with an inner surface and where said first coupling member is provided on said inner surface; and
   said adapter has a substantially cylindrical outer surface, and said second coupling member is provided on said outer surface for mating with the first coupling member of said electrical box by rotation of said adapter from a first position to a second position.

3. The electrical box assembly of claim 2, wherein
   said coupling member of said electrical box includes a plurality of spaced apart teeth, and said coupling member of said adapter includes a plurality of spaced apart teeth configured for mating with said teeth of said electrical box by rotation of said adapter with respect to said electrical box.

4. The electrical box assembly of claim 1, wherein said locking member is an electrical grounding member coupled to said inner surface of said adapter, and where said grounding member has ground screw positioned in said passage of said adapter and a tab extending through said opening in said adapter and received in said groove in said adapter to prevent rotation of said adapter with respect to said electrical box.

5. The electrical box assembly of claim 4, wherein said locking member is fixed to said adapter.

6. The electrical box assembly of claim 4, wherein said adapter includes a lip on an inner surface for supporting an electrical wiring device, and where said grounding member is coupled to said lip of said adapter.

7. The electrical box assembly of claim 1, wherein said longitudinal groove is aligned with said opening in said adapter when said coupling member of said adapter is engaged with said coupling member of said electrical box.

8. The electrical box assembly of claim 1, wherein said coupling member of said electrical box includes at least one tooth, and said coupling member of said adapter includes at least one groove for mating with said locking member to fix the axial position of said adapter with respect to said electrical box.

9. An electrical box assembly comprising:
an electrical box having an opening providing access into the electrical box, said opening defining a passage having an inner surface, and a coupling member on the inner surface of said opening; and
an adapter received in said passage for sliding movement to adjust an axial position of said adapter with respect to said electrical box, said adapter having an open top end and configured for supporting an electrical wiring device, and having a coupling member;
said adapter being configured to rotate with respect to said electrical box between a first position where said coupling member of said adapter does not engage said coupling member of said electrical box whereby said adapter is removable from said electrical box, and a second position where said coupling member on said adapter engages said coupling member on said electrical box to fix the axial position of said adapter with respect to said electrical box by rotation of said adapter with respect to said electrical box.

10. The electrical box assembly of claim 9, wherein said inner surface of said open end of said electrical box has a first coupling member, and an outer surface of said adapter has a second coupling member configured for mating with said first coupling member of said electrical box by the rotational movement of the adapter.

11. The electrical box assembly of claim 10, wherein said first coupling member on said electrical box includes at least one tooth, and said second coupling member on said adapter includes at least one groove for mating with said tooth to fix the axial position of said adapter with respect to said electrical box.

12. The electrical box assembly of claim 10, wherein Said first coupling member of said electrical box includes a plurality of spaced apart teeth and said second coupling member of said adapter includes a plurality of spaced apart teeth configured for mating with said teeth of said electrical box by rotation of said adapter with respect to said electrical box.

13. The electrical box assembly of claim 10, further comprising
a locking member extending longitudinally between said adapter and said inner surface of said opening in said electrical box to prevent rotation of said adapter with respect to said electrical box.

14. The electrical box assembly of claim 10, further comprising
a device grounding member coupled to said adapter, said grounding member having a locking member extending through an opening in said adapter for mating with a longitudinal groove on an inner surface of said opening in said electrical box.

15. An electrical box assembly comprising:
an electrical box having a riser defining an open top end of said electrical box and providing access into said electrical box, said riser having an inner surface forming an open passage extending between said open top end and a cavity of said electrical box, said inner surface of said open passage of said riser having a coupling member; and
an adapter received in said passage of said riser for axial sliding adjustment between a first retracted position and a second extended position, said adapter being rotatable between a first position where said adapter can slide within said riser and is removable from said riser, and a second position where a coupling member on said adapter mates with the coupling member on said riser to fix the axial position of said adapter with respect to said riser.

16. The electrical box assembly of claim 15, further comprising
a locking member engaging an outer surface of said adapter and an inner surface of said opening in said riser of said electrical box to prevent rotation of said adapter with respect to said electrical box.

17. The electrical box assembly of claim 16, wherein said inner surface of said open passage in said electrical box includes a longitudinal groove, and said outer surface of said adapter has a longitudinal groove, and where said locking member is received in said groove in said electrical box and into said groove in said adapter to prevent rotation of said adapter with respect to said electrical box.

18. The electrical box assembly of claim 15, further comprising
a device grounding member coupled to an inner surface of said adapter, and a locking tab extending from said grounding member through an opening in said adapter for mating with an inner surface of said opening in said electrical box.

19. The electrical box assembly of claim 15, wherein said inner surface of said open passage of said electrical box has at least one tooth, and said outer surface of said adapter and said at least one groove for mating with said tooth to fix the axial position of said adapter with respect to said electrical box.

20. The electrical box assembly of claim 15, wherein said inner surface of said open passage of said electrical box includes a plurality of spaced apart teeth, and said adapter includes a plurality of spaced apart teeth configured to mate with said teeth of said electrical box by rotation of said adapter with respect to said electrical box to fix the axial position of said adapter with respect to said electrical box.

\* \* \* \* \*